US000001466H

United States Statutory Invention Registration [19]

[11] Reg. Number: H1466

Stapf

[43] Published: Aug. 1, 1995

[54] OXYGEN INJECTION SYSTEM

[75] Inventor: Roger A. Stapf, Dunlap, Ill.

[73] Assignee: Caterpillar Inc., Del.

[21] Appl. No.: 183,616

[22] Filed: Jan. 19, 1994

[51] Int. Cl.[6] ..... F02B 23/00
[52] U.S. Cl. ..... 123/585
[58] Field of Search ..... 123/1 A, 585

[56] References Cited

U.S. PATENT DOCUMENTS 3,861,367 1/1975 Kelmar ..... 123/1 A
4,078,535 3/1978 Shafer ..... 123/198 D
4,960,098 10/1990 Akerib ..... 123/589

FOREIGN PATENT DOCUMENTS 57-102551 6/1982 Japan .
59-158365 9/1984 Japan .

*Primary Examiner*—Charles T. Jordan
*Assistant Examiner*—Theresa M. Wesson
*Attorney, Agent, or Firm*—Diana L. Charlton

[57] ABSTRACT

The design and construction of past oxygen injection systems having an oxygen mixer to inject oxygen into an air intake pipe required the use of oxygen in a highly pressurized state. The use of high pressure oxygen required precise pressure control in order to maintain safety. Additionally, the high pressure tank used for storing the oxygen was not space efficient due to the large volume occupied by the oxygen in the gaseous state. The present invention overcomes these problems by utilizing oxygen in the liquid state. Liquid oxygen is stored within a more space efficient storage tank. A solenoid is signaled through an electronic control unit to open under specific operating conditions allowing liquid oxygen to flow from the storage tank. Upon leaving the storage tank, the liquid oxygen is converted to a gaseous state where it flows through an oxygen supply pipe so that the oxygen can be injected by an oxygen mixer into an air intake pipe for mixing with ambient air. The ability to increase the oxygen level during specific operating conditions produces more efficient combustion and reduction in black smoke.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OXYGEN INJECTION SYSTEM

DESCRIPTION

1. Technical Field

This invention relates generally to an oxygen injection system for use in a diesel engine and more particularly to the use of liquid oxygen in order to boost intake air volume.

2. Background Art

During acceleration, diesel engines inject more fuel into a combustion chamber in order to increase horsepower and RPM. Unfortunately, ambient air from outside the engine is not received fast enough for proper mixing with the fuel in the combustion chamber during this time. The improper mixing of fuel and air leads to black smoke which is contrary to present day goals of improving emissions.

The goal of one prior art diesel engine disclosed in Japanese Publication No. 57-179180 by Akira Oohashi on Dec. 18, 1980 was to decrease the amount of black smoke by injecting oxygen into an air intake pipe from a high pressure tank to complete combustion by obtaining a more favorable fuel/air ratio. This was accomplished by metering the oxygen injected into the intake pipe to a specific quantity based upon fuel injection quantity and engine load. However, the use of high pressure oxygen requires precise pressure control. Additionally, the high pressure tank used for storing the oxygen is not space efficient due to the large volume occupied by the oxygen in the gaseous state. Furthermore, the precise metering of the oxygen in relation to fuel and load conditions may be complex and costly.

The present invention is directed to overcoming the problems as set forth above.

DISCLOSURE OF THE INVENTION

In one aspect of the present invention an oxygen injection system adapted for use with a diesel engine includes a cylinder block which defines a bore having a cylinder liner therein. The cylinder liner defines a cylinder bore and a cylinder head attaches to the cylinder block in closing relation to the cylinder bore. A piston is reciprocally mounted in the cylinder bore and defines with the cylinder block a variable volume combustion chamber. An intake pipe is fluidly connected to the combustion chamber for communicating ambient air into the combustion chamber during an intake cycle of the engine. An oxygen mixer is connected to the intake pipe and an oxygen supply pipe is connected at an end to the oxygen mixer. A liquified oxygen storage tank is connected to the oxygen supply pipe at an opposite end. A main valve has a normally closed position and an open position and is disposed within the oxygen supply pipe between the oxygen storage tank and the oxygen mixer. A regulator and heat exchanger is disposed within the oxygen supply pipe between the main valve and the oxygen mixer. A means for controllably opening the main valve under predetermined engine operating conditions is included so that liquid oxygen from the oxygen storage tank is converted to a gaseous state and communicated to the oxygen mixer in order to combine with the ambient air in the intake pipe.

The present invention, through the use of injecting liquid oxygen converted to a gaseous state into an intake air pipe, provides a simple, economical, and space-efficient means to improve fuel/air mixing for more efficient combustion and reduction of black smoke.

BEST MODE FOR CARRYING OUT THE INVENTION

Figure 1:
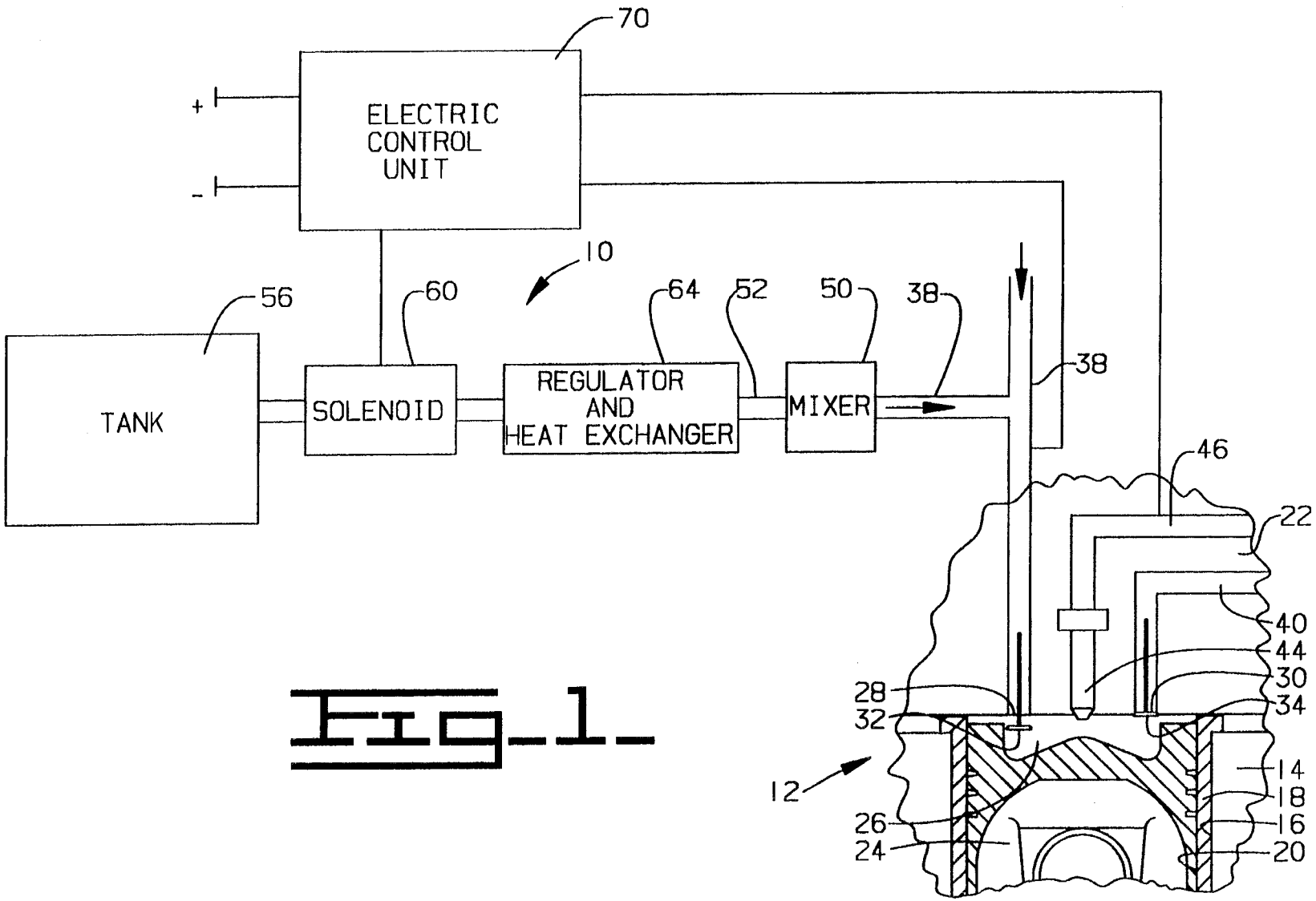
FIG. 1 is diagrammatic representation embodying the present invention.

An oxygen injection system 10 for a diesel engine 12 having a cylinder block 14 defining a bore 16 is shown in FIG. 1. The bore 16 has a cylinder liner 18 disposed therein. The cylinder liner 18 defines a cylinder bore 20 and a cylinder head 22 attaches to the cylinder block 14 in closing relation to the cylinder bore 20. A piston 24 is reciprocally mounted in the cylinder bore 20 and defines with the cylinder block 14 a variable volume combustion chamber 26. An intake port 28 and exhaust port 30 are formed in the cylinder head 22. An intake valve 32 and exhaust valve 34 having a normally closed position and an open position are disposed within the intake port and exhaust port 28,30, respectively. An intake pipe 38 and an exhaust pipe 40 are connected to the intake port and the exhaust port 28,30, respectively so that the intake pipe and exhaust pipe 38,40 are fluidly connected to the combustion chamber 26. The intake pipe 38 fluidly communicates ambient air into the combustion chamber 26 during an intake cycle of the engine 12. The exhaust pipe fluidly communicates exhaust gases out of the combustion chamber 26 during an exhaust stroke of the engine 12. A fuel injector 44 is located within the cylinder head 22 and is fluidly connected to the combustion chamber 26. A fuel supply pipe 46 is connected to the fuel injector 44 at an end and to a fuel source (not shown) at an opposite end. A turbocharger (not shown) is connected to the exhaust pipe 40 and to the intake pipe 38 between the combustion chamber 26 and the ambient air.

An oxygen mixer 50 of any suitable type is connected to the intake pipe 38 and includes a nozzle (not shown) therein. An oxygen supply pipe 52 is connected at an end to the oxygen mixer 50 and an opposite end is connected to a liquified oxygen storage tank 56 of any suitable type. A main valve 60, such as a solenoid valve, having a normally closed and an open position is disposed within the oxygen supply pipe 52 between the oxygen storage tank 56 and the oxygen mixer 50. A regulator and heat exchanger 64 of any suitable type, such as that used on a propane engine, is disposed within the oxygen supply pipe 52 between the main valve 60 and the oxygen mixer 50.

A means 70 for controllably opening the main valve 60 includes an electronic control unit, any other suitable means may be used to controllably open the main valve 60 such as an electrical or mechanical device. The electronic control device is connected to the fuel supply pipe 46 and the intake pipe 38.

Industrial Applicability

In use and during acceleration, high pressure fuel is injected into the combustion chamber 26 by the fuel injector 44 at an increased rate. The electronic control unit 70 measures air or boost pressure and fuel rate simultaneously. If the boost pressure is more than a specified level below the normal boost pressure for the steady state fuel rate, then the electronic control unit 70 produces a signal which opens the solenoid 60. By opening the solenoid 60, liquid oxygen from the storage tank 56 flows into the oxygen supply pipe 52. Upon leaving the storage tank 56, the liquid oxygen is converted to a gaseous state and it flows through the solenoid 60 and into the regulator and heat exchanger 64. As liquid oxygen is converted to the gaseous state, an increase in pressure may occur. For this reason, the heat regulator and heat exchanger 64 are incorporated to operate in a conventional manner to reduce the pressure of the oxygen while assuring that a constant temperature is maintained during the process. The oxygen remains in the gaseous state as it flows from the regulator and heat exchanger 64 through the oxygen supply pipe 52 and into the oxygen mixer 50. The oxygen mixer 50 operates in a conventional manner to inject the oxygen still in the gaseous state into the intake pipe 38 so that it is mixed with the ambient air. When the electronic control unit 70 senses that the boost pressure is at a normal level for the steady state fuel rate, it sends a signal to close the solenoid 60. Once the solenoid 60 is closed, liquid oxygen is unable to leave the storage tank 56.

In view of the above, it is apparent that the present invention provides an improved means to increase the supply of oxygen during acceleration to reduce black smoke. The present invention utilizes an oxygen mixer for injecting liquid oxygen converted to a gaseous state into an intake air pipe providing a simple, economical, and space-efficient means to improve fuel/air mixing for more efficient combustion and reduction of black smoke.

I claim:

1. An oxygen injection system adapted for use with a diesel engine including a cylinder block defining a bore having a cylinder liner therein defining a cylinder bore, a cylinder head attached to the cylinder block in closing relation to the cylinder bore, a piston reciprocally mounted in the cylinder bore and defining with the cylinder block a variable volume combustion chamber, and an intake pipe fluidly connected to the combustion chamber for communicating ambient air into the combustion chamber during an intake cycle of the engine, comprising:

an oxygen mixer connected to the intake pipe;

an oxygen supply pipe connected at an end to the oxygen mixer;

a liquified oxygen storage tank connected to the oxygen supply pipe at an opposite end;

a main valve having a normally closed position and an open position disposed within the oxygen supply pipe between the oxygen storage tank and the oxygen mixer;

a regulator and heat exchanger disposed within the oxygen supply pipe between the main valve and the oxygen mixer; and means for controllably opening the main valve under predetermined engine operating conditions so that liquid oxygen from the oxygen storage tank is converted to a gaseous state and is communicated to the oxygen mixer in order to combine with the ambient air in the intake pipe.

* * * * *